United States Patent
Gillis et al.

(10) Patent No.: US 6,601,566 B2
(45) Date of Patent: Aug. 5, 2003

(54) FUEL INJECTOR WITH DIRECTLY CONTROLLED DUAL CONCENTRIC CHECK AND ENGINE USING SAME

(75) Inventors: Edward R. Gillis, Bloomington, IL (US); Dana R. Coldren, Fairbury, IL (US); Charles D. Ellenbecker, Normal, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/903,332

(22) Filed: Jul. 11, 2001

(65) Prior Publication Data

US 2003/0010320 A1 Jan. 16, 2003

(51) Int. Cl.⁷ .......................... F02M 61/18; F02M 55/02
(52) U.S. Cl. ....................... 123/468; 123/575; 123/467; 239/585.5
(58) Field of Search ................... 123/467, 468, 123/472, 456, 27 GE, 525, 575; 239/88, 90, 91, 94, 96, 533.1, 533.2, 533.3, 533.4, 533.7, 533.8, 533.9, 585.1, 585.4, 585.5

(56) References Cited

U.S. PATENT DOCUMENTS

| | | | |
|---|---|---|---|
| 2,898,051 A | | 8/1959 | Teichert |
| 4,202,500 A | | 5/1980 | Keiczek |
| 4,284,043 A | | 8/1981 | Happel |
| 4,382,554 A | * | 5/1983 | Hofmann .................. 239/533.9 |
| 4,546,739 A | * | 10/1985 | Nakajima et al. ........... 123/299 |
| 4,601,269 A | | 7/1986 | Kato et al. |
| 4,605,166 A | | 8/1986 | Kelly |
| 4,758,169 A | | 7/1988 | Steiger |
| 4,856,713 A | | 8/1989 | Burnett |
| 4,984,738 A | | 1/1991 | Winquist |
| 5,067,658 A | | 11/1991 | De Matthaeis et al. |
| 5,076,240 A | | 12/1991 | Perr |
| 5,163,397 A | * | 11/1992 | Pien ........................ 123/299 |
| 5,315,973 A | | 5/1994 | Hill et al. |
| 5,328,094 A | | 7/1994 | Goetzke et al. |
| 5,329,906 A | * | 7/1994 | Jensen et al. ............... 123/299 |
| 5,458,292 A | | 10/1995 | Hapeman |
| 5,485,957 A | | 1/1996 | Sturman |
| 5,494,219 A | | 2/1996 | Maley et al. |
| 5,533,672 A | | 7/1996 | Peters |
| 5,628,293 A | | 5/1997 | Gibson et al. |
| 5,720,318 A | | 2/1998 | Nagarajan et al. |
| 5,772,123 A | | 6/1998 | Augustin et al. |
| 5,884,611 A | | 3/1999 | Tarr et al. |
| 5,890,459 A | * | 4/1999 | Hedrick et al. ......... 123/27 GE |
| 5,899,389 A | | 5/1999 | Pataki et al. |
| 5,961,052 A | | 10/1999 | Coldren et al. |
| 5,984,210 A | | 11/1999 | Forck et al. |
| 5,996,558 A | | 12/1999 | Ouellette et al. |
| 6,024,297 A | * | 2/2000 | Greeves ................... 239/533.8 |
| 6,073,862 A | * | 6/2000 | Touchette et al. ........... 239/408 |

(List continued on next page.)

FOREIGN PATENT DOCUMENTS

JP 10787 * 1/1994 .......... F02M/43/04

Primary Examiner—Henry C. Yuen
Assistant Examiner—Hai Huynh
(74) Attorney, Agent, or Firm—Liell & McNeil (57) ABSTRACT

In dual fuel engines, it is desirable to have injection of two distinct quantities of liquid fuel. Engines with these operating requirements have typically used two separate fuel injectors, or two separate nozzle assemblies, to satisfy this need. However, these systems can be rather complex and difficult to control. In addition, engineers have learned that fuel injectors having direct control have better performance which can increase engine efficiency. Therefore, the present invention addresses the needs of engines desiring injection of two distinct quantities of fuel, such as dual fuel engines, by utilizing a direct control fuel injector having a dual concentric check having separate orifices for the pilot and main injections.

20 Claims, 4 Drawing Sheets

U.S. PATENT DOCUMENTS

| | | |
|---|---|---|
| 6,220,528 B1 | 4/2001 | Cooke et al. |
| 6,260,775 B1 * | 7/2001 | Lambert et al. ......... 239/533.3 |
| 6,279,840 B1 | 8/2001 | Buckley |
| 6,298,833 B1 * | 10/2001 | Douville et al. ........ 123/27 GE |
| 6,336,598 B1 * | 1/2002 | Touchette et al. ........... 239/408 |
| 6,338,445 B1 | 1/2002 | Lambert et al. |
| 6,378,503 B1 * | 4/2002 | Lambert ..................... 123/468 |
| 6,431,469 B2 * | 8/2002 | Lambert et al. ......... 239/533.3 |
| 6,434,945 B1 * | 8/2002 | Mandai et al. ............... 60/39.3 |
| 6,439,192 B1 * | 8/2002 | Ouellette et al. ........... 123/299 |
| 6,471,142 B1 * | 10/2002 | Lambert ....................... 239/88 |

* cited by examiner

Fig_1_

FUEL INJECTOR WITH DIRECTLY CONTROLLED DUAL CONCENTRIC CHECK AND ENGINE USING SAME

TECHNICAL FIELD

This invention relates generally to electrically controlled fuel injectors and, more particularly, to fuel injectors with a directly controlled dual concentric check valve.

BACKGROUND

In a dual fuel engine, a fuel injector is used to inject liquid fuel, such as diesel distillate, into the engine cylinder, and a second system is responsible for delivering a second type of fuel, such as natural gas. For such dual fuel engines it is desirable to be able to inject two distinct quantities of liquid fuel. A small pilot injection of diesel fuel is used to assist in ignition of a main charge of gaseous fuel when the engine is operating in dual fuel mode. However, when gaseous fuel is unavailable, or for some other reason diesel-only operation of the engine is desired, a larger injection of only diesel is made.

In the past, it would have been necessary to use two separate fuel injectors, or at least two separate nozzle assemblies in an engine with these operating requirements. One nozzle would have been necessary for the small initial pilot injection, and a second nozzle would have been necessary for the larger diesel-only injection. Such systems tend to be complex and difficult to control. It is thus desirable to create a system capable of fulfilling the dual fuel injection requirements with a single injector.

A dual concentric check design is known in the art. Lauren W. Burnett invented one example of such an injector in 1989 that could be used to inject both liquid fuel and slurry fuel through concentric nozzle outlets. It is shown in U.S. Pat. No. 4,856,713. However, this injector is not directly controlled, and designed for a liquid or slurry mixture injection rather than for use in a dual fuel engine.

A typical diesel engine must operate with a broad range of fuel quantities and operating speeds. The necessary precision of injection timing, injection duration, and the provision of sufficient pressure are difficult to accomplish with a single fuel injector. Direct control allows for better performance by enabling the precise control of injection timing and duration. As a result, the engine operates more efficiently and the fuel burns more completely, producing lower emissions.

The present invention is directed to overcoming one or more of the problems and disadvantages set forth above.

SUMMARY OF THE INVENTION

A directly controlled dual concentric check fuel injector has an injector body that defines a nozzle chamber, a check control chamber, and a plurality of nozzle outlets. A dual concentric check assembly is at least partially positioned in the injector body, and has a closing hydraulic surface exposed to fluid pressure in the check control chamber. The dual concentric check assembly is movable between a first position in which the nozzle outlets are blocked, a second position in which a first portion of the nozzle outlets are open, and a third position in which a second portion of the nozzle outlets are open.

In another aspect, a method of injecting fuel includes a step of providing a fuel injector with a plurality of nozzle outlets and a directly controlled dual concentric check assembly. The check assembly has a closing hydraulic surface exposed to fluid pressure in a check control chamber. The check control chamber is connected to a low pressure passage. The check assembly is moved to a configuration in which at least a portion of the nozzle outlets are open. Finally, the check control chamber is connected to a high pressure passage.

In still another aspect, the dual fuel engine includes a plurality of directly controlled dual concentric check fuel injectors attached to an engine housing. Each of these injectors has a dual concentric check assembly at least partially positioned in the injector body. Each of the assemblies has a closing hydraulic surface that is exposed to fluid pressure in a check control chamber. The dual concentric check assembly is movable between a first configuration in which the nozzle outlets are blocked, a second configuration in which a first portion of the nozzle outlets are open, and a third configuration in which all of the nozzle outlets are open. A source of liquid fuel is fluidly connected to the fuel injectors.

DETAILED DESCRIPTION

The present invention combines the high efficiency of direct control with a single fuel injector capable of delivering two distinct quantities of fuel. It employs a dual concentric check assembly 72 operated with an electrically actuated direct control valve assembly.

The injector has dual-check nozzles with separate orifices for pilot and main injection that are operated by electronic actuator control. The outer check has a relatively low valve opening pressure and controls a set of orifices with a smaller flow area. The inner check has a relatively high valve opening pressure and controls a set of spray orifices with a relatively large flow area. Combined with a standard unit pump or high pressure fuel common rail, the dual concentric check design provides a fuel injection system capable of higher initial injection pressures. The result is an improvement of the combustion burn quality, especially at part engine loads. To achieve improved delivery ratios between the fuel delivery from the outer check outlets alone, and the fuel delivery with both checks open, electronic direct control is necessary.

Figure 1:
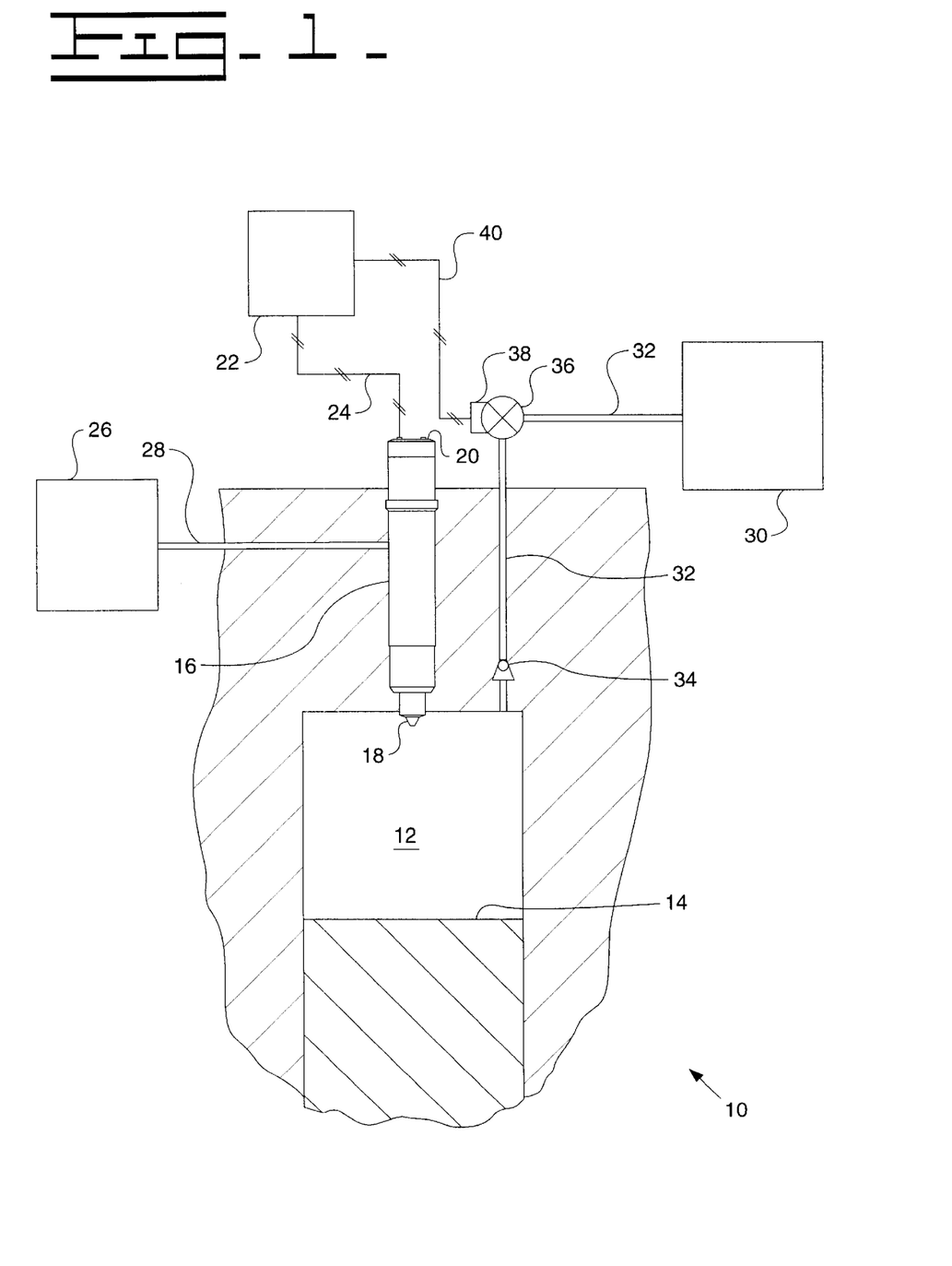
FIG. 1 is a partial diagrammatic representation of a dual fuel engine that includes a dual concentric direct operated check fuel injector according to the present invention.

Referring to FIG. 1, there is shown a system level diagram of a dual fuel engine 10 application of a dual concentric direct operated fuel injector 16 according to the present invention. Either version of the fuel injector described herein can be utilized in dual fuel engine 10, which would employ a plurality of such injectors attached to an engine housing. The method of supplying pressurized fuel within engine 10 may be with a high pressure common rail 26, but it might also be accomplished with a plurality of electronic unit pumps connected to each injector or any other suitable method known in the art. Engine 10 also has a source of gaseous fuel fluidly connected to the engine housing. Engine 10 is capable of operation with a combination of liquid and gaseous fuel or liquid fuel alone. Engine 10 has a fuel injector 16 according to the present invention whose tip 18 protrudes into cylinder 12. Liquid fuel from liquid fuel supply 26 is supplied to injector 16 via liquid fuel supply line 28. The injection of liquid fuel into cylinder 12 is controlled by an electrical actuator 20 attached to injector 16. Electrical actuator 20 is controlled with electronic control module 22 via communication line 24 in a conventional manner. When electrical actuator 20 is energized, liquid fuel is injected into cylinder 12 via injector tip 18.

When dual fuel operation is desired, gaseous fuel from gaseous fuel supply 30 is supplied via gaseous fuel supply line 32 to cylinder 12, controlled by control valve 36. The opening and closing of control valve 36 is achieved with electronic actuator 38, itself controlled in operation by electronic control module 22 via communication line 40 in a conventional manner.

The combustion of liquid and/or gaseous fuel in cylinder 12 creates force that acts on piston 14. In dual fuel mode, the compression ignition of the diesel fuel pilot injection ignites the gaseous fuel from the main injection. This provides the force that acts on piston 14. In diesel-only mode, the compression ignition of the liquid diesel fuel alone creates the force that acts on piston 14. A check valve 34 positioned within gaseous supply line 32 prevents the leaking of pressure out of cylinder 12 through gaseous supply line 32 during combustion.

Figure 2:
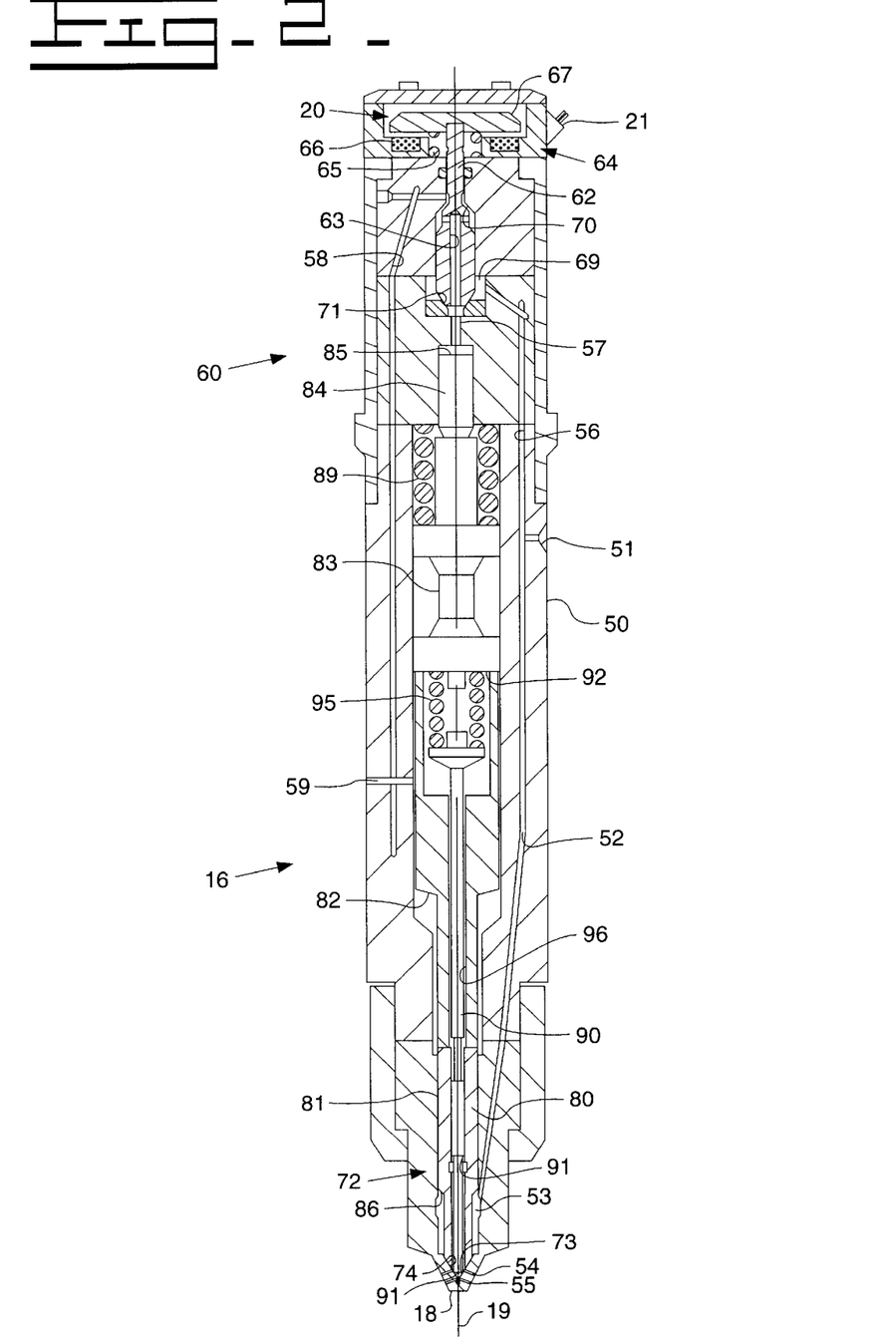
FIG. 2 is a diagrammatic sectioned side view of the preferred embodiment of the fuel injector from FIG. 1.

Referring to FIG. 2, there is shown a diagrammatic sectioned side view of a direct control dual concentric check fuel injector 16 according to the present invention. The injector shown in FIG. 2 is the preferred embodiment of the present invention and may employ either a high pressure fuel common rail system or an electronic unit pump as the means of pressurizing fuel. Fuel injector 16 consists of an injector body 50 made up of various components attached to one another in a manner well known in the art, and a number of movable parts positioned in the manner they would be at the initiation of an injection event. As discussed with regard to FIG. 1, liquid fuel source 26, either a high pressure fuel common rail or an electronic unit pump, supplies pressurized fuel to injector 16 through liquid fuel supply line 28. The pressurized fuel enters injector 16 through fuel inlet 51, defined by injector body 50, and is supplied thenceforth to a pressure communication passage 56 (high pressure passage) and a nozzle supply passage 52, both defined by injector body 50. Pressure communication passage 56 is in constant fluid communication with a control volume 69, defined by injector body 50. The present invention uses pressurized fuel as the control hydraulic fluid, though it should be appreciated that engine oil, transmission, power steering, brake, coolant, or some other suitable engine fluid might be used.

Fuel injector 16 is controlled in operation by a control valve assembly 60, preferably attached to and located within the injector itself. Control valve assembly 60 has an electrical actuator 20 that is preferably a solenoid. It should be appreciated, however, that another suitable device such as a piezoelectric actuator might be used. Solenoid 64 has a coil 66, and an armature 67, which is attached to a control valve member 62. An electrical connector 21 connects solenoid 64 with the control module 22. A biasing spring 65 biases armature 67 and solenoid 64 toward their upward position closing low pressure seat 70.

Control valve member 62 has been shown as a poppet valve, though it should be appreciated that another suitable valve type, such as a spool, might be used. Control valve member 62 is movable within injector body 50 between an upward (off) position in which it closes low pressure seat 70 and a downward (on) position in which it closes high pressure seat 71.

When solenoid 64 is de-energized and control valve member 62 is in its upward position closing low pressure seat 70, control volume 69 provides fluid communication between pressure communication passage 56 and needle (check) control chamber 57. The high pressure fluid supplied to needle control chamber 57 exerts a downward force on closing hydraulic surface 85 of piston 84. When solenoid 64 is energized, and control valve member 62 is in its downward position closing high pressure seat 71, internal passage 63 provides fluid communication between needle control chamber 57 and vent passage 58. Vent passage 58 is relatively low pressure and connects to a vent outlet 59 defined by injector body 50. The up or down state of control valve member 62 thus determines whether there is hydraulic pressure acting on the hydraulic surface of piston 84 and, as discussed below, whether the dual check nozzle outlets 54 and 55 are open or closed.

Within injector body 50, piston 84 abuts an outer check coupler 83 that in turn attaches to outer check extension 82. Outer check extension 82 abuts an outer check needle member 81. The outer check 80 is comprised of piston 84, outer check coupler 83, outer check extension 82, and outer check needle member 81. Outer check 80 moves up and down within injector body 50 to open and close outlets 54. An outer check biasing spring 89 exerts a downward force on outer check coupler 83, biasing the assembly toward a down position in which outer check needle member 81 is held to close outer check seat 73. Seated thusly, outer check 80 closes a first set of nozzle outlets 54 distributed radially around a centerline 19 and fluidly isolates inner check 90 from nozzle chamber 53. Thus, when electrical actuator 20 is de-energized, and closing hydraulic surface 85 of piston 84 is exposed to high pressure fuel, the entire outer check assembly 80 is biased downward against outer check seat 73, closing the outer check nozzle outlets 54.

Housed in part within outer check extension 82 and in part within outer check needle member 81 is an inner check 90 which is mechanically biased downward by an inner check biasing spring 95 to close inner check seat 74. Inner check 90 thus holds closed the inner check nozzle outlets 55 that are distributed radially around the centerline 19 of injector 16. Inner check 90 moves up and down within a center passageway 96 defined in part by outer check needle member 81 and in part by outer check extension 82. Inner check 90 is preferably guided in its movement by a matched clearance with outer check needle member 81.

As described above, high pressure fuel is continuously supplied to nozzle chamber 53 via nozzle supply passage 52. Inside nozzle chamber 53, the high pressure fuel exerts an upward force on the outer check opening hydraulic surfaces 86. When outer check 80 opens, inner check 90 becomes fluidly connected to nozzle chamber 53 and high pressure fuel can act on the inner check opening hydraulic surfaces 91.

The area of piston closing hydraulic surface 85 and the strength of outer check biasing spring 89 are preferably such that outer check nozzle outlet 54 is held closed in spite of the constant opening hydraulic force on its opening hydraulic surfaces 86 when pressure communication passage 56 is open to needle control chamber 57. Those skilled in the art will appreciate that opening hydraulic surfaces 86 are preferably sized such that outer check 80 will open when needle control chamber 57 is fluidly connected to low pressure passage 58. The outer check valve opening pressure (VOP) is defined by the pressure in low pressure passage 58, the area of piston hydraulic surface 85, the strength of biasing spring 89, and the effective area of opening hydraulic surfaces 86.

The valve opening pressure of inner check nozzle outlet 55 is defined by the strength of inner check biasing spring 95 and the size of inner check opening hydraulic surfaces 91. In the preferred embodiment, the relevant parts of the injector are sized such that the outer check VOP is relatively low as compared to the inner check VOP. Additionally, the flow area of outer check nozzle outlets 54 is preferably significantly less than the flow area of inner check nozzle outlets 55. However, different application of the invention might call for a different flow area relationship.

Figure 3:
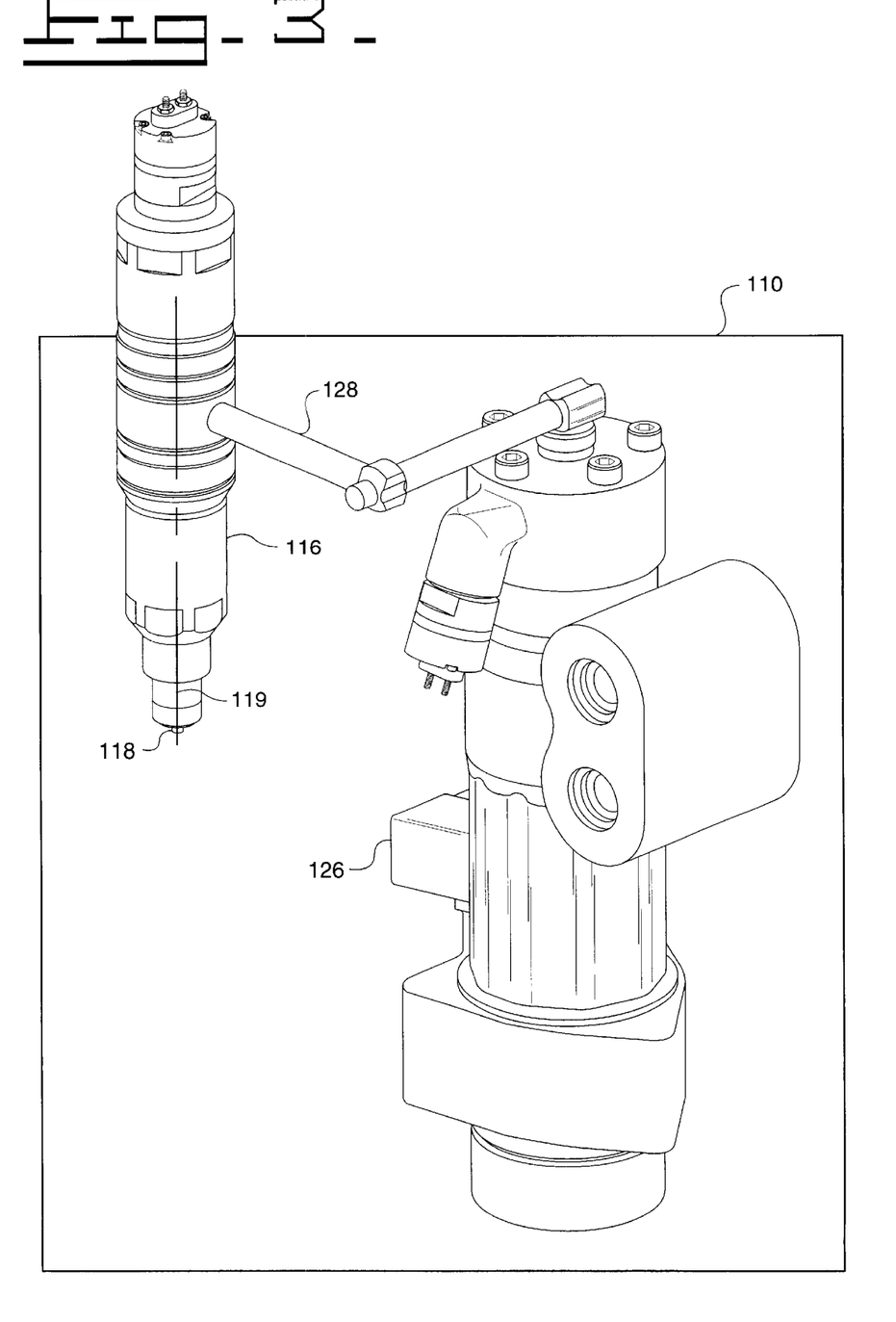
FIG. 3 is a diagrammatic representation of a pump-line-nozzle fuel injection system that includes another embodiment of a dual concentric direct operated check fuel injector according to the present invention.

Referring to FIG. 3, there is shown a diagrammatic representation of a pump-line-nozzle system 110 that has a dual concentric check DOC controlled fuel injector 116 according to another embodiment of the present invention. In contrast to the high pressure fuel common rail system, the system pictured in FIG. 3 employs an electronic unit pump 126 for pressurizing and supplying fuel to injector 116 via liquid fuel supply line 128. Adjusting timing and duration of the electronic unit pump 126 controls peak fuel pressure in high pressure line 128, that is, low pressure prevails in high pressure line 128 between injection events.

Figure 4:
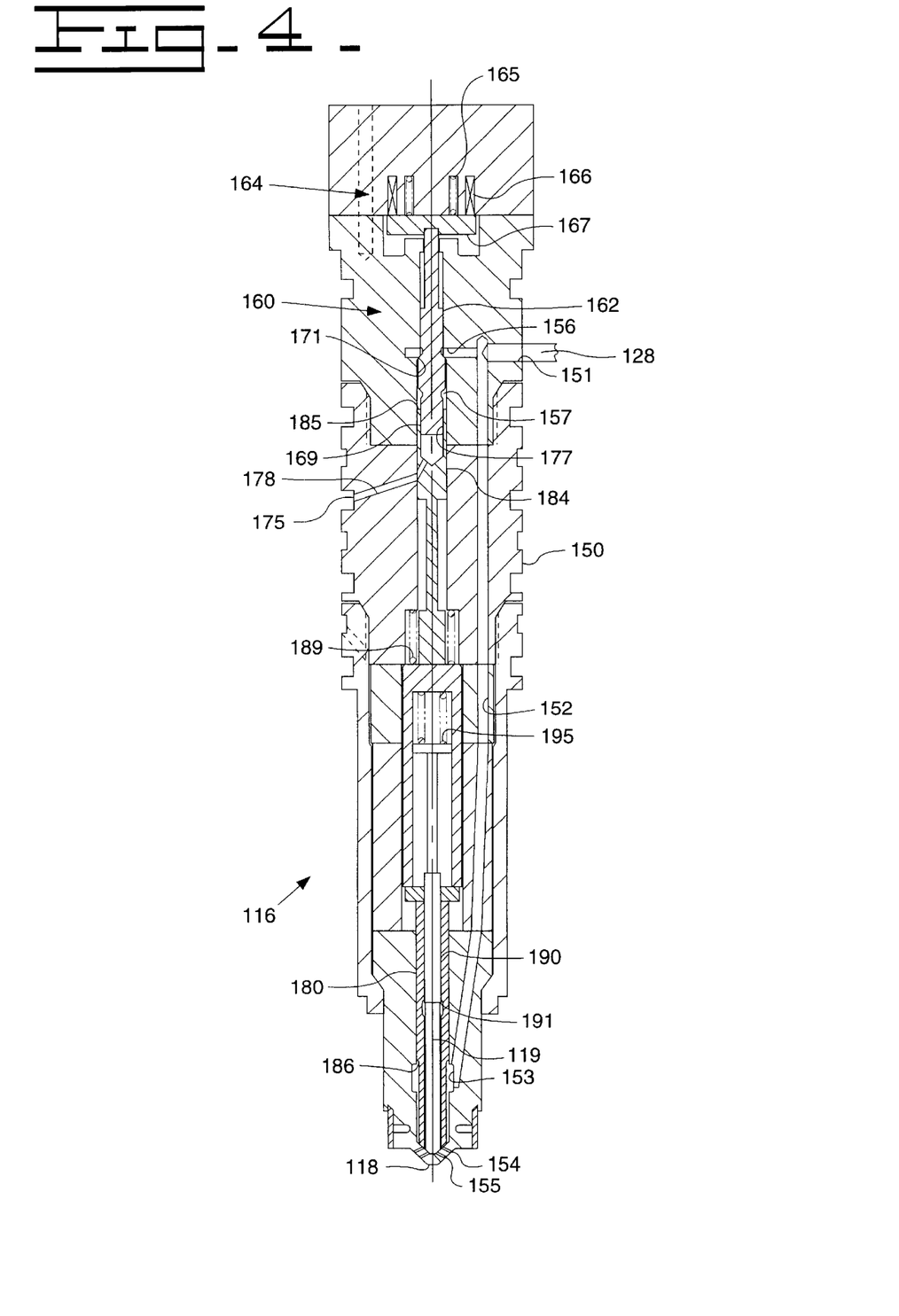
FIG. 4 is a diagrammatic sectioned side view of the fuel injector of FIG. 3.

Referring to FIG. 4, there is shown a diagrammatic sectioned side view of a dual concentric check DOC controlled fuel injector 116 according to the embodiment of the present invention shown in FIG. 3. Injector 116 operates in a similar manner to the preferred embodiment of the present invention, but with several significant differences. Like injector 16, injector 116 is supplied with high pressure fuel via a supply line 128. In contrast to injector 16, the control valve assembly 160 employs a controlled leakage strategy to control pressure. After the fuel enters injector body 150 through fuel inlet 151, the high pressure fuel travels through nozzle supply passage 152 to a nozzle chamber 153, and through pressure communication passage 156 to a control valve assembly 160. Control valve assembly 160 consists of an electrical actuating device 164 and a valve member 162 that moves up and down within injector body 150. Electrical actuator 164 consists of a coil 166 and an armature 167 that is attached to control valve member 162. Electrical actuator 164 is preferably a solenoid, but like injector 16 another suitable device might be used.

When actuator 164 is de-energized, armature 167 and thereby control valve member 162 are biased downward by biasing spring 165. Control valve member 162 is positioned partly within the top of piston 184. Fuel in check control chamber 157 can flow past high pressure seat 171 and around control valve member 162 to act on closing hydraulic surface 185 of piston 184. The fuel then drains through leak passage 178 and out vent outlet 195. It should be appreciated that the inside diameter 177 of piston 184 and the outside diameter 169 of control valve member 162 should be sized such that pressurized fuel can flow around control valve member 162 and to leak passage 178. However, if the clearance between inside diameter 177 and outside diameter 169 is too large, fuel will leak past control valve member 162 at an unacceptably high rate. If the clearance is too small, fuel cannot flow through fast enough and the pressure drop in check control chamber 157 can be too delayed and unpredictable to allow accurate timing of injection. The hydraulic force acting on closing hydraulic surface 185 of piston 184 biases piston 184 downward. As a result, outer check 180 holds outer check nozzle outlet 154 closed in a manner similar to that employed in injector 16. Inner check 190 operates in much the same way that inner check 90 does in injector 16. Outer check 180's VOP is defined by the pressure in leak passage 178, the strength of biasing spring 189, the area of piston closing hydraulic surface 185, and the area of outer check 180's opening hydraulic surface.

It should be appreciated that the relative area of piston closing hydraulic surface 185, the strength of outer check biasing spring 189, and the area of outer check opening hydraulic surfaces 186 are preferably such that outer check 180 will open when control valve member 162 closes high pressure seat 171. However, outer check 180 preferably remains closed when control valve member 162 is in its down position, and high pressure seat 171 is open. Inner check 190's VOP is defined by the area of inner check opening hydraulic surfaces 191 and the strength of inner check biasing spring 195. It should be appreciated that the area of inner check opening hydraulic surfaces 191 and the strength of biasing spring 195 are preferably such that inner check 190's VOP is less than the VOP of outer check 180.

When electrical actuator 164 is energized, control valve member 162 moves toward its upward position. When control valve member 162 reaches the upper limit of its travel, it closes high pressure seat 171 and thereby blocks fluid communication between pressure communication passage 156 and control chamber 157. As a result, the hydraulic pressure on closing hydraulic surface 185 of piston 184 drops dramatically due to the controlled leakage through vent passage 178. Consequently, piston 184 exerts very little downward force on outer check 180. In the preferred embodiment, pressurized fuel acting on the outer check opening hydraulic surfaces 186 can force the outer check 180 to open outer check nozzle outlets 154 and inject fuel into the combustion space when high pressure seat 171 is closed, but not when seat 171 is open. This embodiment of the present invention might in theory be used with either a common rail or unit pump hydraulic system.

However, the controlled leakage embodiment presents significant problems when used with a common rail system. Continuous leakage of fuel makes the maintenance of sufficient pressure in the common rail problematic and the wastage of energy unacceptable. Therefore, this second embodiment of the present invention should preferably employ an electronically controlled unit pump or some other periodic pressurizing device as the means of pressurizing fuel.

INDUSTRIAL APPLICABILITY

In the preferred embodiment of the present invention, prior to an injection event, solenoid 64 is de-energized and control valve member 62 is biased toward its up (off) position by the force of biasing spring 65. In this state, control valve member 62 closes low pressure seat 70. Control volume 69 fluidly connects needle control chamber 57 and pressure communication passage 56. Thus, high pressure prevails in needle control chamber 57 and acts on piston closing hydraulic surface 85. The high pressure acting on piston closing hydraulic surface 85 and the force of spring 89 bias outer check 80 downward against outer check seat 73 to close outer check nozzle outlets 54. When outer check 80 is held against outer check seat 73, inner check 90 is fluidly isolated from nozzle chamber 53, and is held closed by the force of inner check biasing spring 95. Nozzle chamber 53 is always supplied with high pressure fuel via nozzle supply passage 52, regardless of the state of control valve assembly 60.

When an injection event is desired, solenoid 64 is energized whereby control valve assembly 60 and control valve member 62 begin to move downward, opening low pressure seat 70. When low pressure seat 70 is opened, internal passage 63 provides fluid communication between control volume 69 and vent passage 58. At the instant that low pressure seat 70 is opened, both pressure communication passage 56 and needle control chamber 57 are exposed to relatively low pressure. However, when control valve member 62 reaches the downward limit of its travel, it closes high pressure seat 71. It should be appreciated that the distance control valve member 62 must travel to close high pressure seat 71 is relatively small, and the assembly travels relatively quickly.

When high pressure seat 71 is closed, the internal passage 63 of control valve member 62 ceases to provide fluid communication between control volume 69 and vent passage 58, but continues to fluidly connect needle control chamber 57 with vent passage 58. As a result, the hydraulic pressure in needle control chamber 57 drops dramatically. There is no longer substantial hydraulic pressure acting on closing hydraulic surface 85 and only the force of biasing spring 89 acts to push outer check 80 downward.

Recall that nozzle chamber 53 is always exposed to high pressure fuel via nozzle supply line 52, and thus high pressure fuel is continuously acting on the outer check opening hydraulic surfaces 86. The force on outer check opening hydraulic surfaces 86 thus pushes outer check 80 up away from seat 73, and high pressure fuel in nozzle chamber 53 sprays out outer check nozzle outlets 54 into the combustion space. When outer check 80 opens, the opening hydraulic surfaces of inner check 90 become exposed to the high pressure fuel in nozzle chamber 53. Whether there is sufficient pressure to overcome the VOP of inner check 90 is controlled by adjusting the pressure of the fuel supplied by the common rail or electronic unit pump.

Recall that the valve opening pressure (VOP) of outer check 80 is defined by the strength of biasing spring 89 and the size of outer check opening hydraulic surfaces 86. Similarly, the VOP of inner check 90 is defined by the strength of inner check biasing spring 95 and the size of inner check opening hydraulic surfaces 91. In dual fuel mode operation, where injection of only a relatively small amount of liquid fuel is desired, the fuel pressure should be set such that it is sufficient to overcome the VOP of the outer check, but insufficient to overcome the VOP of the inner check. In this manner, the quantity of liquid fuel injected is relatively small given the relatively small flow area of the outer check nozzle outlets 54. For a single fuel application the fuel pressure should be adjusted such that it is sufficient to overcome the VOP of both the outer check 80 and the inner check 90. With the pressure adjusted accordingly, an injection event will occur whereby both checks are opened and fuel sprays through the relatively large combined flow areas of nozzle outlets 54 and 55.

Shortly before the desired amount of fuel has been injected, the current to solenoid 64 is shut off. Control valve member 62 opens high pressure seat 71 and begins to move back toward its upward (off) position. When high pressure seat 71 is opened, needle control chamber 57 is once again exposed to high pressure fuel from pressure communication passage 56 via control volume 69. With the assistance of biasing spring 89, the high pressure in needle control chamber 57 exerts downward force on piston closing hydraulic surface 85, and pushes the entire outer check 80 down against outer check seat 73. This closes outer check nozzle outlets 54, and fluidly isolates the inner check opening hydraulic surfaces 91 from nozzle chamber 53. Consequently, inner check biasing spring 95 forces inner check 90 down against seat 73 to close inner check nozzle outlets 55, and the injection of fuel through both sets of nozzle outlets ceases.

The second embodiment of the present invention, shown in FIG. 4, also allows direct control of the injection event. This version does not have a low pressure seat, but instead employs a controlled leakage to provide low pressure in control chamber 157 when injection is desired. Between injection events, the electrical actuating device is de-energized, and control valve assembly 160 is in its downward position. High pressure seat 171 is open, and high pressure fuel flows around control valve member 162 to act on piston 184's closing hydraulic surface 185. The hydraulic pressure assists in holding the outer check closed in a very similar manner to that employed in injector 16. In this de-energized state, the pressurized fuel flows out leak passage 178 at a relatively constant rate.

When an injection event is desired, electrical current is supplied to actuating device 164, and the control valve assembly begins to move upward. When control valve member 162 reaches the upper end of its travel, it closes high pressure seat 171. As a result, high pressure fuel is blocked from flowing past control valve member 162 and acting on piston closing hydraulic surface 185. The controlled leakage out passage 195 allows the pressure in control chamber 157 to drop. In a manner similar to injector 16, the high pressure fuel in nozzle chamber 153 may act to open outer check 180 and/or inner check 190, depending on whether single fuel or dual fuel operation of the engine is desired.

Shortly before the desired amount of fuel has been injected, electrical actuating device 164 is de-energized. Control valve member 162 begins to move to its downward position, and opens high pressure seat 171. As high pressure seat 171 opens, pressurized fuel begins to flow around control valve member 162, and hydraulic pressure once again acts on piston closing hydraulic surface 185. The resultant closing of outer check 180 and 190 takes place in a very similar way to the preferred embodiment of the present invention.

The present invention allows precise control of fuel injection in an engine that operates on a single liquid fuel or a combination of liquid and gaseous fuel. By simply varying the pressure at which the fuel is supplied to the injector, a relatively small or a relatively large quantity of fuel can be injected. This system is advantageous because it allows the high efficiency of direct control to be combined with the versatility of a dual fuel engine. Direct control allows the injection of two discrete quantities of fuel. Furthermore, the present invention can be operated with one of two different fuel pressurization systems, adding further versatility.

It should be understood that the present description is for illustrative purposes only and is not intended to limit the scope of the present invention in any way. Although the invention was described in the context of a dual fuel engine, other engines could benefit from the present invention. For example, a dual concentric check might be employed where injection of different quantities of fuel is desired for reasons other than dual fuel operation, like different engine operating speeds or varying engine loads. Those skilled in the art will recognize that direct control of the present invention could allow for split injections. Alternately energizing and de-energizing the electrical actuator could allow for a variety of injection schemes. Small point injections might be made sequentially or might be alternated with larger main injections, depending on the operating conditions. Thus, those skilled in the art will appreciate that various modifications could be made to either of the described embodiments without departing from the intended scope of the present invention.

Other aspects and features of the present invention can be obtained from a study of the drawings, the disclosure, and the appended claims.

What is claimed is:

1. A fuel injector comprising:
   an injector body defining a nozzle chamber, a check control chamber, a plurality of nozzle outlets;
   a dual concentric check assembly at least partially positioned in said injector body and including a closing hydraulic surface exposed to fluid pressure in said check control chamber;
   said dual concentric check assembly being movable between a first configuration in which said nozzle outlets are blocked to said nozzle chamber, a second configuration in which a first portion of said nozzle outlets are open to said nozzle chamber, and a third configuration in which a second portion of said nozzle outlets are open to said nozzle chamber; and
   a first spring operably positioned to bias an outer check toward a first seated position, and a second spring operably positioned to bias an inner check toward a second seated position.

2. The fuel injector of claim 1 wherein said plurality of nozzle outlets includes a first set of nozzle outlets distributed around a centerline and a second set of nozzle outlets distributed around said centerline; and
   said first portion of said nozzle outlets is said first set of nozzle outlets, and said second portion of said nozzle outlets is said first set of nozzle outlets plus said second set of nozzle outlets.

3. The fuel injector of claim 1 including an electronically controlled valve attached to said injector body, and being movable between an off position in which said check control chamber is fluidly connected to a high pressure passage, and an on position in which said check control chamber is fluidly connected to a low pressure passage.

4. The fuel injector of claim 3 wherein said nozzle chamber and said high pressure passage are fluidly connected to a source of fuel when said electronically controlled valve is in said off position.

5. The fuel injector of claim 1 wherein said dual concentric check assembly includes said outer check that includes said closing hydraulic surface, and said inner check at least partially positioned within said outer check.

6. The fuel injector of claim 5 wherein said outer check includes a first opening hydraulic surface exposed to fluid pressure in said nozzle chamber;
   said inner check includes a second opening hydraulic surface exposed to fluid pressure in said nozzle chamber when said outer check is away from said first seated position;
   said first spring and said first opening hydraulic surface define a relatively low valve opening pressure; and
   said second spring and said second hydraulic surface define a relatively high valve opening pressure.

7. A method of injecting fuel, comprising the steps of:
   providing a fuel injector with a plurality of nozzle outlets, and a directly controlled dual concentric check assembly that includes a closing hydraulic surface exposed to fluid pressure in a check control chamber;
   connecting said check control chamber to a low pressure passage;
   moving said dual concentric check assembly to one of a first configuration and a second configuration in which first and second portions of said nozzle outlets are open to a nozzle chamber, respectively;
   connecting said check control chamber to a high pressure passage; and
   biasing said dual concentric check toward a closed configuration in which said plurality of nozzle outlets are blocked at least in part via a first spring and a second spring.

8. The method of claim 7 wherein said moving step includes the steps of:
   connecting a nozzle chamber to a source of fuel at a fuel pressure; and
   adjusting said fuel pressure to a level that is sufficient to move said dual concentric check assembly to a configuration that opens less than all of said nozzle outlets.

9. The method of claim 7 wherein said moving step includes the steps of:
   connecting a nozzle chamber to a source of fuel at a fuel pressure; and
   adjusting said fuel pressure to a level that is sufficient to move said dual concentric check assembly to a configuration that opens all of said nozzle outlets.

10. The method of claim 7 wherein said step of connecting said check control chamber to a low pressure passage is accomplished at least in part by energizing an electrical actuator; and
    said step of connecting said check control chamber to a high pressure passage is accomplished at least in part by de-energizing said electrical actuator.

11. The method of claim 7 wherein said dual concentric check includes an outer check and an inner check;
    and the method includes the steps of:
    establishing a relatively low valve opening pressure for said outer check; and
    establishing a relatively high valve opening pressure for said inner check.

12. The method of claim 11 including the steps of:
    connecting a nozzle chamber to a source of fuel at a fuel pressure;
    adjusting said fuel pressure to a level between said relatively high valve opening pressure and said relatively low valve opening pressure for a first injection cycle; and
    readjusting said fuel pressure to a level above said relatively high valve opening pressure for a subsequent injection cycle.

13. The method of claim 11 including the steps of:
    attaching said fuel injector to a dual fuel engine;
    connecting said fuel injector to a source of fuel at a fuel pressure;
    setting said fuel pressure between said relatively high valve opening pressure and said relatively low valve opening pressure when said engine is in a gaseous fuel mode; and
    setting said fuel pressure above said relatively high valve opening pressure when said engine is in a liquid fuel mode.

14. The method of claim 7 wherein said dual concentric check assembly is movable between a first configuration in which said nozzle outlets are blocked to said nozzle chamber, a second configuration in which a portion of said nozzle outlets are open to said nozzle chamber, and a third configuration in which all of said nozzle outlets are open to said nozzle chamber; and the method includes a step of:

setting a combined flow area through said portion of said nozzle outlets to be a relatively small fraction of a combined flow area through all of said nozzle outlets.

15. An engine comprising:

a plurality of directly controlled dual concentric check fuel injectors attached to an engine housing;

each of said fuel injectors a dual concentric check assembly at least partially positioned in an injector body and including a closing hydraulic surface exposed to fluid pressure in a check control chamber;

said dual concentric check assembly being movable between a first configuration in which a plurality of nozzle outlets are blocked to a nozzle chamber, a second configuration in which a first portion of said nozzle outlets are open to said nozzle chamber, and a third configuration in which all of said nozzle outlets are open to said nozzle chamber; and     a source of liquid fuel fluidly connected to each of said fuel injectors, and said source of liquid fuel including at least one of a unit pump and a common rail.

16. The engine of claim 15 including a source of gaseous fuel fluidly connected to said engine housing.

17. The engine of claim 15 including an electronically controlled valve attached to said injector body, and being movable between an off position in which said check control chamber is fluidly connected to a high pressure passage, and an on position in which said check control chamber is fluidly connected to a low pressure passage.

18. The engine of claim 17 wherein said high pressure passage is fluidly connected to said source of liquid fuel.

19. The engine of claim 15 wherein said dual concentric check assembly includes an outer check that includes said closing hydraulic surface, and an inner check at least partially positioned within said outer check.

20. The engine of claim 19 including a first spring operably positioned to bias said outer check toward a first seated position, and a second spring operably positioned to bias said inner check toward a second seated position;

said outer check includes a first opening hydraulic surface exposed to fluid pressure in said nozzle chamber;

said inner check includes a second opening hydraulic surface exposed to fluid pressure in said nozzle chamber when said outer check is away from said first seated position;

said first spring and said first opening hydraulic surface define a relatively low valve opening pressure; and     said second spring and said second hydraulic surface define a relatively high valve opening pressure.

\* \* \* \* \*